Patented Feb. 19, 1935

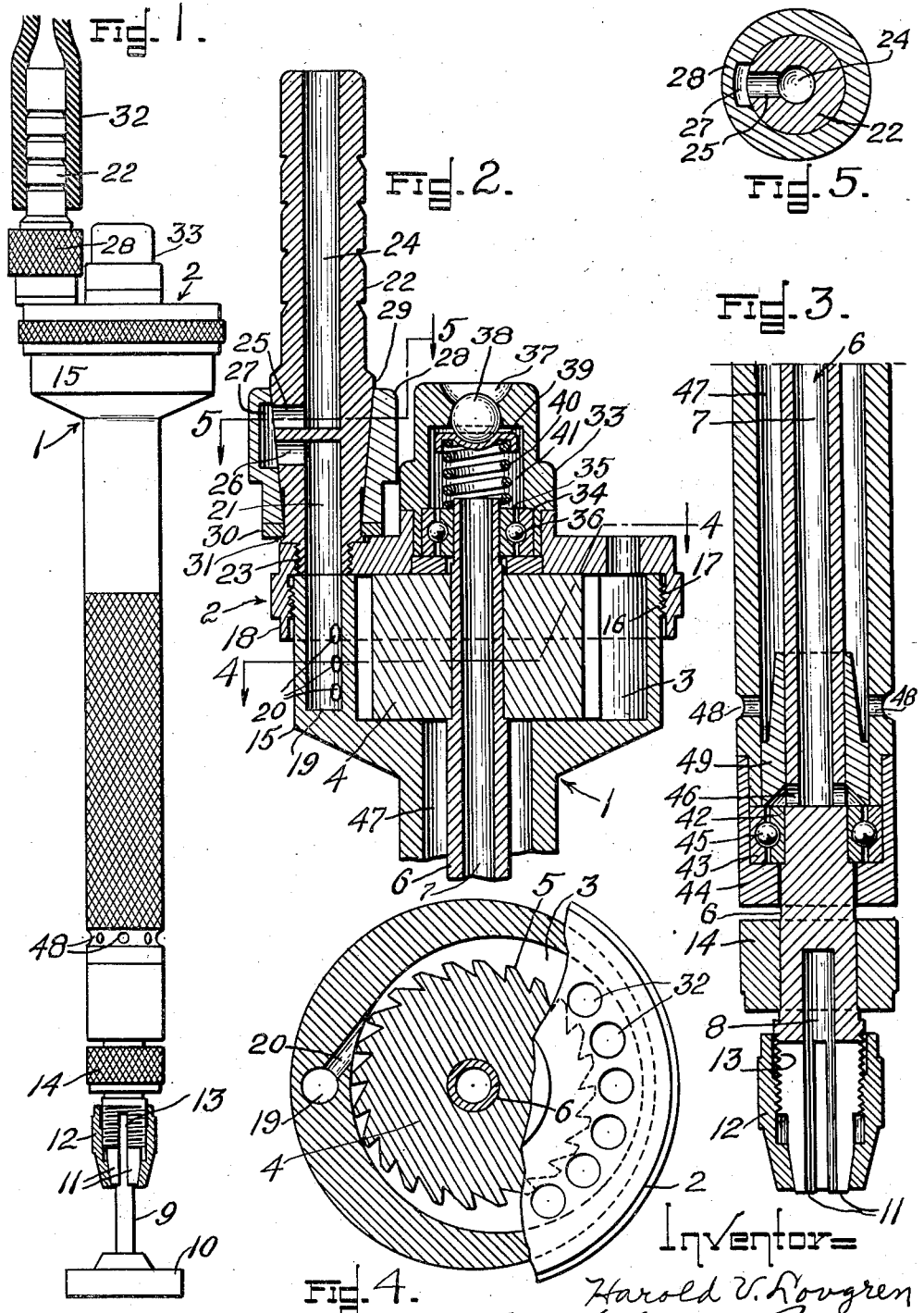

1,991,764

UNITED STATES PATENT OFFICE 1,991,764

FLUID OPERATED GRINDING TOOL

Harold V. Lovgren, Boston, Mass., assignor to Henry T. Nelson, Cambridge, Mass.

Application August 11, 1934, Serial No. 739,511

5 Claims. (Cl. 253—2)

My invention relates to a fluid operated hand tool for use in cutting, grinding, polishing and like operations and it has for its object to provide an improved and efficient tool of this class which will be of simple and inexpensive construction.

To these ends I have provided a novel fluid operated hand tool of the class indicated having the peculiar features of construction and mode of operation set forth in the following description, the several novel features of the invention being separately pointed out and defined in the claims at the close thereof.

In the accompanying drawing:

Figure 1 is an elevation, partly in section, of a fluid operated hand tool constructed in accordance with this invention.

Figure 2 is a central longitudinal sectional view, enlarged, of the upper portion of the tool shown in Figure 1.

Figure 3 is a central longitudinal sectional view, enlarged, of the lower portion of the tool shown in Figure 1.

Figure 4 is a section on line 4—4 of Figure 2.

Figure 5 is a section on line 5—5 of Figure 2.

The embodiment of my invention herein illustrated comprises a tubular housing section 1 and a housing cap section 2, the former providing an elongate handle by means of which the tool is manipulated. The inner end portion of the tubular section 1 is enlarged interiorly and exteriorly to provide a cylindrical chamber 3 within which is arranged a turbine rotor or wheel 4, said rotor being constructed upon its periphery with radial vanes or teeth 5 extending from one end face to the opposite end face of said rotor and disposed parallel with respect to the axis of the latter.

Rotor 4 is fixedly mounted upon the inner end of a shaft or spindle 6 which extends loosely through the tubular handle section 1, said spindle being made tubular throughout the greater portion of its length to provide a conduit 7. The outer end portion of spindle 6 is made with a socket 8 for the shank 9 of a work-engaging implement or cutter 10 and is also split longitudinally to provide a plurality of shank-gripping jaws 11 which are clamped against the shank 9 of the work-engaging tool by means of an interiorly threaded nut 12 mounted upon the exteriorly threaded outer end portion 13 of said spindle. In this way the outer end of the spindle 6 is provided with a tool-holding chuck, the nut 12 serving to cause the chuck to grip the shank of the tool when said nut is screwed inwardly and to free said shank when said nut is screwed outwardly.

In order that the workman may hold the spindle 6 against rotation when nut 12 is operated as described, the said spindle has rigidly fixed thereon an exteriorly knurled sleeve or flange member 14. Thus by holding the flange member 14 with one hand so that it cannot rotate, the nut 12 may be quickly and conveniently tightened or loosened.

The enlarged inner end portion 15 of the housing section 1 is exteriorly threaded as at 16 for engagement with threads 17 provided upon the interior of a skirt 18 that is part of the cap member 2 of the housing. The exterior of the skirt 18 is knurled to provide a finger hold while the exterior of the tubular housing section 1 is also knurled for the same purpose. Thus the two sections can be screwed together or apart manually with ease.

As shown in Figure 4, the axis of the cylindrical chamber 3 is eccentrically disposed with respect to the axis of the spindle 6 so that the periphery of rotor 4 is approximately in contact with the circular wall of chamber 3 at one side thereof. The enlarged inner end portion 15 of section 1 is exteriorly circular or cylindrical and concentric with the axis of spindle 6 so that the portion of the wall of chamber 3 that is nearest rotor 4 is of substantial thickness and of sufficient thickness to be formed with a drilled port 19 whose axis is parallel with the axis of spindle 6. This port 19 is provided with three outlets 20 which lead into chamber 3 tangentially with respect to the latter and also with respect to rotor 4.

At one end thereof the port 19 is in register with a port 21 formed longitudinally in the inner end portion of a nipple member 22, said inner end portion of the nipple member being exteriorly threaded as at 23 and screwed into a threaded hole provided in the cap section 2 of the housing.

The outer end portion of the nipple member 22 is formed with a longitudinal axially disposed port 24 made at its inner end with a radially disposed branch port 25. At its outer end the port 21 of the nipple member is also made with a radially disposed port 26. The outer ends of the two ports 25 and 26 are in close proximity and co-operatively associated with a port 27 provided upon the interior of a valve sleeve 28. The valve sleeve 28 is interiorly conical and is fitted to an exteriorly conical portion 29 of the nipple member 22. The valve sleeve 28 is permanently secured in position upon the conical portion 29 of the nipple member by means of a collar 30 that is locked in position upon the inner end portion of nipple member 22 by a shoulder 31 on said nipple member that is produced by upsetting the material of the latter. The valve sleeve 28 is rotatably mounted on the nipple member 22 and when manually positioned so that the port 27 upon the interior thereof is in register with both branch ports 25 and 26 as in Figs. 2 and 5 then the two ports 21 and 24 are in communication through the ports 25, 26 and 27, but when valve sleeve 28 is rotatively adjusted so that the port 27 is not in register with the ports 25 and 26 then there is no communication between ports 21 and 24.

The outer end portion of nipple member 22 is adapted to receive upon it telescopically one end of a flexible tube or pipe 32 whose opposite end is connected with a source of fluid under pressure. It will therefore be clear that when valve sleeve 28 is rotatively adjusted to register its port 27 with the ports 25 and 26 fluid under pressure will pass into ports 21 and 19 and from the latter through ports 20 into chamber 3. It will also be clear that the fluid under pressure thus admitted to chamber 3 impinges tangentially upon the periphery of rotor 4 and thereby rotates the latter and spindle 6. In this way the implement 10 is rotated to perform its work.

The eccentricity of the rotor 4 with respect to the circular wall of chamber 3 provides a crescent-shaped space between said rotor and said wall and the portion of the cap member 2 which is opposite the wider portion of this crescent-shaped space is formed with a series of outlet ports 32 whose inner ends communicate with said space and whose outer ends communicate with the outside atmosphere. Thus the fluid supplied to chamber 3 circulates around the rotor 4 for a substantial distance carrying said rotor with it until said fluid discharges through the outlets 32.

The housing section 2 is made with a centrally disposed aperture into which is forcibly fitted one end of a nipple 33 within which is secured one end of the race rings 34 of a ball bearing. The other race ring 35 of this bearing is secured to the inner end of the spindle 6 and between the two rings are arranged the usual series of balls 36.

At its outer end the nipple 33 is made with an oil inlet port 37 that is normally closed by an inwardly opening ball valve 38 which is yieldingly held upon its seat by means of a sheet metal cup member 39 and spring 40. The cup member 39 and spring 40 are disposed within an oil chamber 41 provided upon the interior of nipple 33 and when the device is to be lubricated the nozzle of an oil can is pushed downwardly upon the ball valve 38 and the oil is delivered into the chamber 41 from which it flows downwardly through the ball bearing 34—35—36 into chamber 3 and also downwardly through the interior of the tubular inner portion of the spindle 6.

Near its outer end the spindle 6 has fixed thereon one of the race rings 42 of a ball bearing whose other race ring 43 is fixedly mounted within a sleeve 44 forcibly fitted on to the lower or outer end of the tubular handle portion of housing section 1. As usual, a series of balls 45 is provided between the two rings 42 and 43. Adjacent to and immediately above the ball bearing 42—43—45, the spindle 6 is made with one or more radial ports 46 whose inner ends communicate with the interior 7 of the tubular inner portion of the spindle. It will thus be clear that when oil is supplied to the chamber 41 of nipple 33 it flows downwardly through the hollow spindle 6 and thence outwardly through the port or ports 46 to the lower ball bearing to lubricate the latter.

The outside diameter of the inner portion of spindle 6 is less than the inside diameter of the tubular handle portion of the housing section 1 thereby providing a conduit or annular space 47 extending from rotor chamber 3 downwardly nearly to the ball bearing 42—43—45.

Adjacent to its lower or outer end the tubular handle portion of housing section 1 is formed with a plurality of radial ports 48 whose inner ends communicate with the conduit 47 and whose outer ends communicate with the outside atmosphere. It will thus be clear that any fluid under pressure which is able to pass around rotor 4 into conduit 47 will traverse the tubular handle portion of housing section 1 for the greater portion of its length and then discharge through the ports 48 into the outside atmosphere. It will also be clear that this fluid under pressure in expanding while thus discharging through and from housing section 1 will tend to absorb and carry off heat. To facilitate this absorption and removal of heat by the exhausting fluid under pressure I provide a closure sleeve 49 for the lower end of the conduit 47, said closure sleeve being forcibly fitted into the lower end of the tubular handle portion of housing section 1 and surrounding the spindle 6. Thus sleeve 49 tends to conduct heat away from the bearing 42—43—45 to the fluid under pressure as the latter approaches and discharges through the ports 48.

The greater portion of the tubular handle section 1 is of quite small diameter and therefore the elements of the ball bearings near the opposite ends of the spindle 6 are necessarily very small and the balls 36 and 45 are so small that in the absence of lubrication they would soon be destroyed through overheating owing to the very high rate of speed at which the spindle is ordinarily driven. Therefore the lubricating system herein disclosed is of considerable importance and practical value since the balls of these bearings will serve indefinitely if maintained properly lubricated. Also it is a feature of advantage that all running parts are thoroughly lubricated by means of a lubricant inserted into the mechanism through a single oil hole.

What I claim is:

1. A tool of the character described having, in combination, a housing comprising a tubular handle section having a laterally enlarged inner end portion formed interiorly with a cylindrical chamber that is eccentrically disposed with respect to the axis of said section, and a cap section separably secured to the enlarged inner end portion of said tubular handle section opposite one end of said cylindrical chamber; a spindle extending longitudinally and axially through said tubular handle section and having its inner end portion made tubular to provide an oil conduit whereof one end is accessible for the reception of lubricating oil, said spindle being supported adjacent to its inner end by a bearing provided on said cap section which is accessible for reception of a lubricant and also supported adjacent to its outer end by a bearing provided within the outer end portion of said tubular handle section which latter bearing is supplied with oil through a radial outlet port formed in said spindle and communicating at its inner end with the interior of the tubular portion of said spindle; a rotor wheel eccentrically disposed within said chamber and fixedly connected with said spindle, and means for delivering fluid under pressure into said chamber including an inlet port by which the fluid is directed tangentially against the periphery of said rotor wheel, one of said housing sections being made with an exhaust port communicating with said chamber at a point that is angularly spaced away from said inlet port.

2. A tool of the character described constructed in accordance with claim 1 wherein said tubular handle section is made of greater internal diameter than the external diameter of said spindle to provide a conduit for fluid under pressure which passes into the same from said chamber, and wherein said handle section is also made with outlet ports communicating with the interior thereof in close proximity to said last mentioned bearing.

3. A tool of the character described constructed in accordance with claim 1 wherein the outer end portion of said spindle extends beyond the outer end of said tubular handle section and is provided with a radial flange affording a finger-hold and wherein the outer end portion of said spindle is constructed with an implement-holding chuck including as a part thereof an operating nut that is rotatably adjusted on the spindle to set and unset said chuck.

4. A tool of the character described constructed in accordance with claim 1 wherein said cap section is constructed with an oil chamber communicating with the inner end of the interior of said spindle and with an oil inlet communicating with said chamber, and wherein an inwardly opening check valve is provided within said oil chamber which normally maintains said oil inlet closed and a spring is provided for yieldingly holding said check valve in its closed position.

5. A tool of the character described constructed in accordance with claim 1 wherein said cap section is provided with a rearwardly extending nipple that is laterally off-set with respect to the axes of said rotor and chamber and adapted to be coupled to a flexible pipe through which fluid under pressure is supplied to the tool, said nipple having its outer end portion made with a longitudinal axially disposed port having a radially disposed branch at its inner end and its inner end portion made with an axially disposed port communicating at one end with the inlet port of said chamber and at its outer end with a radially disposed branch that is positioned alongside of said first mentioned branch, and including a valve sleeve rotatably mounted upon said nipple for controlling communication between said branches and adjustable to start, stop and regulate the speed of said rotor.

HAROLD V. LOVGREN.